United States Patent [19]

Goodrich

[11] 4,207,231
[45] Jun. 10, 1980

[54] ROSIN ACID ESTERS AS STABILIZERS FOR ASPHALT PREMIX

[75] Inventor: Judson E. Goodrich, San Rafael, Calif.

[73] Assignee: Chevron Research Company, San Francisco, Calif.

[21] Appl. No.: 38,047

[22] Filed: May 11, 1979

[51] Int. Cl.² .................. C08L 93/04; C08L 95/00
[52] U.S. Cl. ........................... 260/104; 106/232; 260/24; 260/45.85 T; 528/48
[58] Field of Search ............... 260/24, 104, 45.85 T; 106/232; 528/48

[56] References Cited

U.S. PATENT DOCUMENTS

| | | | |
|---|---|---|---|
| 2,340,043 | 1/1944 | Clare | 260/104 |
| 2,420,926 | 5/1947 | Anderson | 260/104 |
| 2,752,263 | 6/1956 | Pierce | 106/232 |
| 2,819,988 | 1/1958 | Smith | 106/232 |
| 3,900,687 | 8/1975 | Meader et al. | 428/489 |
| 4,018,739 | 4/1977 | Okamoto et al. | 528/52 |
| 4,025,683 | 5/1977 | Meader et al. | 428/425 |
| 4,036,797 | 7/1977 | Meader | 260/28 R |

*Primary Examiner*—H. S. Cockeram
*Attorney, Agent, or Firm*—D. A. Newell; S. R. LaPaglia

[57] ABSTRACT

A method is provided for stabilizing a polymerizable premix composition for use in preparing a polyurethane surface and the resulting composition. Lower alkane polyol esters of rosin acids are employed in achieving the stabilization.

9 Claims, No Drawings

ROSIN ACID ESTERS AS STABILIZERS FOR ASPHALT PREMIX

BACKGROUND OF THE INVENTION

This invention relates to an asphalt-containing composition suitable for use in preparing an asphalt-extended polyurethane surface. More particularly, it relates to (1) a method for stabilizing a polymerizable mixture comprising a high molecular weight diol component, a low molecular weight chain stiffener component and an asphalt component, (2) the resulting composition, and (3) a process for preparing said surface using the stabilized mixture.

Polymerizable asphalt-extended mixtures, commonly called premixes, are known in the polyurethane art (see for example U.S. Pat. Nos. 3,896,421; 3,900,687; 4,025,683; and 4,036,797). They are used for the preparation of asphalt-extended polyurethane surfaces for bridge decks, industrial membranes, recreational surfaces, such as running tracks, tennis court surfaces and the like, canal or pond linings, liquid surface coverings as in tanks, ponds and the like, road surface elements and the like, to name but a number of representatives. In the preparation, polyisocyanate, usually aryl diisocyanate, is thoroughly admixed into the premix and the resulting polymerizable or polymerizing mixture is applied or used as desired. The resulting product is an asphalt-extended polyurethane surface.

However, a premix frequently suffers from a serious disadvantage. That is, while initially it may be formuated by thorough mixing into a solution or apparently homogeneous substance, for example a dispersion, upon standing two or more separate phases develop. In separated form, the mixture has little or no value as a premix. It is said to have an unsatisfactory shelf life. Thus, there is a need for an improved premix composition which is fully stabilized against phase separations or at least stabilized to such an extent as to exhibit an improved and satisfactory shelf life.

This invention is directed toward (1) a method for stabilizing a premix, (2) the composition resulting from (1) and (3) a process for preparing an asphalt-extended polyurethane surface using the composition of (2).

SUMMARY OF THE INVENTION

A method is provided for stabilizing, or improving the stability of, a polymerizable mixture comprising a high molecular weight diol component, a low molecular weight chain stiffener component and an asphalt component by including therein an effective amount of a stabilizing agent selected from the group consisting of $C_2$–$C_5$ alkane polyol esters of rosin acids. Optionally, and preferably, the stabilized mixture may also contain a polyisocyanate polymerization catalyst, an inert filler and one or more of the other materials conventionally included in a polyurethane surface, for example, carbon black, a drying agent, clay aggregates, etc.

A further aspect of the invention is the composition resulting from the above-described method.

A yet further aspect of the invention is a process for producing an asphalt-extended polyurethane surface wherein the above-described stabilized composition is admixed with an effective amount of a polyisocyanate component, preferably mainly aryl diisocyanate, and the resulting polymerizable or polymerizing mixture is applied to a substrate and polymerized.

EMBODIMENT

In a preferred embodiment a premix composition is prepared by admixing the following components in the indicated parts by weight:

| | |
|---|---|
| Arabian Light Residuum | 41.64 |
| Rosin Acid-Pentaerythritol Ester | 10.40 |
| N,N-bis(2-hydroxypropyl) Aniline | 5.81 |
| Polybutadienediol (Ave. equivalent wt 1200) | 34.26 |
| Polyethylacrylate | .05 |
| Dibutyl Tin Dilaurate | .01 |
| Toluene | 7.83 |

The above resin acid ester is a commercial product of Hercules Incorporated having a softening point of about 110° C., prepared from pale wood rosin.

Comparative storage stabilities of a representative stabilized premix of the above composition and the same mix less the rosin ester is as follows:

| Storage Stability | Stabilized | Unstabilized |
|---|---|---|
| 2 Months Sludge, Vol.% | 0 | 30 |

Rosin acid esters are effective stabilizers for unstable premix compositions.

By the term "storage stability" as used herein in connection with a polymerizable mixture containing a dispersed asphalt component is meant the period of time required for at least an appreciable amount of the asphalt of the mixture at ambient conditions to coagulate or to precipitate and coagulate as a separate phase.

By the term "polymerizable" as used herein in connection with a polymerizable mixture (a premix) suitable for use in preparing an asphalt-extended polyurethane surface is meant a composition having a Brookfield viscosity in the range 5,000 to 20,000, preferably 6,500 to 8,500 cp at 25° C. (Brookfield Viscometer Model RVF, Spindle No. 5, 20 rpm) and containing the following components:

I. A high molecular weight diol component characterized by (1) a molecular weight in the range of from about 1,000 to 3,000 units of weight and (2) hydroxyl groups located at or near (within about 4 carbon atoms) the terminal carbon atoms which are separated by an amorphous (relatively free of crystallizable areas), chain of at least about 40 carbon atoms; for example, polybutadiene diol, polyisoprene diol, polybutadiene-styrene diol, polybutadiene-acrylonitrile diol and the like high molecular weight diols;

II. A low molecular weight chain stiffener component selected from the group consisting of polyols, polyamines and hydroxylamines characterized by (1) being mainly difunctional but can contain 5–25, preferably 5–10, equivalent percent of tri- and higher-order-functionality molecules, (2) a separation of the hydroxyl and/or amine groups of the molecules by from 2 to about 12 atoms, (3) a carbon atom content in the range of from about 2 to 18, (4) a molecular weight in the range of from about 62 to 300, (5) atoms intermediate the hydroxyl and/or amine groups which besides carbon may be oxygen, nitrogen or sulfur and (6) less than 3 heteroatoms; for example, such chain stiffeners as 3-dimethyl amino-1,2-propanediol, 1,4-di-(hydroxymethyl)cyclohexane, 1,4-butanediol, 4,4'methylene-dianiline, diethanolamine, tolidine, 3-methyl-1,5-pentanediol, trimethylolpropane, glycerine, N,N,N',N'-tetrakis(2- hydroxypropyl)ethylenediamine and N,N-bis(2-hydroxypropyl)aniline; and

III. An asphalt component characterized by (1) a softening point (ASTM-D 36-56) in the range of from about 25 to 65° C.; (2) a viscosity at 60° C. in the range of from about 100 to 8,000 cp and at 135° C. in the range of from about 50 to 900 cp; and (3) an amount in the range of from 2 to 30 volume percent thereof of a low boiling diluent in an amount sufficient to provide the aforementioned viscosity, preferably a largely aliphatic fraction having a boiling range midpoint in the range of about 110°–140° C.; for example natural asphalts such as a steam reduced asphalt, a petroleum crude still bottoms (a topped crude) and/or a cut-back asphalt containing the above-described hydrocarbon diluent;

wherein the mixture contains an amount by weight of (I) in the range of from about 18 to 50 percent, an amount of III in the range of from about 30 to 80 percent and an amount of II sufficient to provide a mol ratio of isocyanate reactive groups of II to the isocyanate reactive groups of I which is in the range of from about 1 to 8, respectively.

The mixture may also contain, and desirably does contain, a minor amount of a catalyst ordinarily used for curing a polyurethane, for example, dibutyl thin dilaurate, diazabicyclooctane, stannous octoate and the like. The dilaurate is preferred.

The mixture may also contain inert additives or fillers normally employed in the preparation of polyurethane surfaces, coatings and the like, for example, carbon black, driers, fillers such as clay, rubber aggregate and the like.

The term "asphalt" is used herein in its commonly accepted meaning. See for example pages 56 and 57 of "Asphalts and Allied Substances" by Herbert Abraham, Vol. I, 4th Edition, D. Van Nostrand Co. Inc., 1938.

ROSIN ACID ESTERS

Rosin acids in their natural and modified forms are well known (see, for example, Encyclopedia of Chemical Technology, Kirk-Othmer, Second Edition, Interscience Publishers, Volume 17, pp. 475–508). These acids are contemplated for use herein in the form of their $C_2$–$C_5$ alkane polyol esters. Representative polyols include ethylene glycol, 1,2-propanediol, 1,3-propanediol, glycerol, the butanediols, butanetriol, erythritol, pentaerythritol and the like polyols. The pentaerythritol esters are preferred.

Rosin (resin) acids are complex mixtures of monocarboxylic acids having the typical molecular formula $C_{20}H_{30}O_2$. Depending upon their source, they are known as gum, wood and tall oil rosin acids and they may be modified acids. The modification may be by partial or complete hydrogenation, by isomerization (usually by thermal or acid catalyzed means), polymerization, or by a Diels-Alder-type addition, for example, maleic anhydride addition. Modified rosin acids and their esters usually exhibit improved stability towards air oxidation and higher softening points and are preferred herein. Desirably, the rosin acid esters employed herein have softening poins (Hercules drop method) above 40° C., preferably in the range 40° to 200° C.

Representative commercially available rosin acid esters suitable for use herein are listed below as well as the supplier and softening points thereof:

| Trade Name | Supplier | Composition | Softening Pt., °C. |
|---|---|---|---|
| Pentalyn K* | Hercules Incorporated | Pentaerythritol Ester of modified Rosin | 192 |
| Pentalyn A* | Hercules Incorporated | Pentaerythritol Ester of Pale Wood Rosin | 111 |
| Poly Pale Ester 10* | Hercules Incorporated | Glycerol Ester of Dimerized Rosin | 112 |
| Zonester* 100 | Arizona Chemical | Pentaerythritol Ester of Tall Oil Rosin | 100 |
| Zonester* 85 | Arizona Chemical | Glycerol Ester of Tall Oil Rosin | 83 |
| Zonester* 75 | Arizona Chemical | Glycerol Ester of Modified Tall Oil Rosin | 78 |
| Zonester* 55 | Arizona Chemical | Glycerol Ester of Modified Tall Oil Rosin | 52 |

*TM

In addition to rosin acids, commercial gum, wood, and tall oil rosins contain a minor amount of a neutral oil component, usually 10–13 weight %, which is mainly esters of rosin and fatty acids. These esters, either in their natural form or as modified in normal processing of a rosin are satisfactory minor components for the use in the method and as compositions of the invention herein.

The amount of the rosin ester required to improve storage stability of a premix varies depending upon the particular asphalt component and rosin ester employed. In general, a satisfactory premix having enhanced storability is obtained, when the amount of rosin ester, based by weight upon the asphalt, is in the range of from about 5 to 30, preferably 10 to 20, percent. Enough rosin ester should be used to provide at least a substantial (20 percent) increase in the storage stability (shelf life) of the premix.

DILUENT/SOLVENT

The premix contains an inert volatile solvent or diluent as required to provide the premix with a viscosity in the range 5,000 to 20,000, preferably 6,500 to 8,500 cp. A viscosity in this range is necessary to facilitate the handling and spreading characteristics of the premix composition. Suitable diluents include toluene, xylenes, low boiling ketones, such as methyl ethyl ketone, hexane, heptane, cyclohexane and the like. Preferably, and for reasons of cost, a preferred diluent is a largely aliphatic low-boiling petroleum refinery fraction or cut having a midpoint of its boiling range in the range of from about 110°–140° C.

POLYMERIZATION

The preparation of an asphalt-extended polyurethane surface, of itself, is known and not considered to be inventive (see, for example, the above-cited U.S. patents). Briefly, a premix plus one or more inert fillers, if desired, is admixed with a polyisocyanate in an amount sufficient to provide in the resulting mixture a ratio of isocyanate group to isocyanate reactive groups (hereinafter referred to as the NCO/OH ratio) in the range of about 0.8–1.4 to 1, preferably 1.05–1.15 to 1, respectively. Where polyisocyanate may be lost due to diffusion from the mixture or for other ordinary reasons, use of a slightly higher NCO/OH ratio may be desirable.

The polyisocyanates will generally be diisocyanates or mixtures of diisocyanates with higher orders of polyisocyanates, normally not exceeding 5 isocyanate groups. Usually, in mixtures of di- and higher order polyisocyanates, the higher order polyisocyanates will be present in not more than 50 equivalent percent, usually not more than 20 equivalent percent. Preferably, diisocyanates are used. The higher order polyisocyanates (greater than di-) have at least 12 carbon atoms and usually do not exceed 46 carbon atoms. The diisocyanates generally vary from about 6 to 24 carbon atoms.

Illustrative polyisocyanates include diphenyl diisocyanate, bis(isocyanatophenyl)methane, 1,5-naphthalene diisocyanate, polyphenyl polymethylene isocyanate (PAPI, supplied by Upjohn Co.), tolyene diisocyanate (TDI), hexamethylene diisocyanate, dodecamethylene diisocyanate, 1,4-diisocyanatocyclohexane, poly (methylene phenylene polyisocyanate). Bis(isocyanatophenyl)methane, for example Isonate (trademark) 143L supplied by Upjohn Polymer Chemicals Co., is preferred.

The following examples are for further illustration, but not limitation, of the invention. All parts, unless otherwise specified, are by weight.

EXAMPLES

In the following examples 1-6 a premix was prepared using an Arabian Light residuum asphalt having a viscosity at 60° C. of about 120 poise. The high molecular weight diol component (HMDIOL) was a polybutadiene diol of average molecular weight 2500-2800. The stiffener was N,N-bis(2-hydroxypropyl)aniline and the catalyst was dibutyl tin dilaurate. For purposes of comparison two premix formulations were employed:

| Formulations Type Components, Parts: | I | II |
|---|---|---|
| Asphalt | 56.47 | 45.18 |
| Resin | None | 11.29 |
| HMDIOL | 37.17 | 37.17 |
| Stiffener | 6.30 | 6.30 |
| Polyethyl Acrylate | .05 | .05 |
| Catalyst | .01 | .01 |

In Table I premix compositions containing a variety of resin modifiers are listed, the storage stability results obtained for them, and polymerization results using the premix and 12-14 g of (Isonate 143L) polyisocyanate per 100 g of diluted premix.

TABLE I

| Example No. | 1 | 2 | 3 | 4 | 5 | 6 |
|---|---|---|---|---|---|---|
| Resin | None | Aliph[1]H-C | Natural[2]H-C | Aromatic[3]H-C | PE-Va[4] | Rosin[5]Ester |
| Formulation Type | I | II | II | II | II | II |
| Initial Brookfield Vis., 25° C., cp | 32,500 | 100,000 | 73,600 | (Heavy Sludge) | 100,000 | 57,600 |
| Added Toluene, g/100g mix | 6.0 | 8.5 | 9.5 | — | 25.0 | 8.5 |
| Final Brookfield Vis., 25° C., cp | 7,200 | 7,360 | 7,360 | — | 7,500 | 6,880 |
| Premix Storage Stability | | | | | | |
| 1 Week | | | | | | |
| Appearance | Heavy Gel | Surface Crust | Surface Crust | (Heavy Sludge) | Slight Surface Crust | Heavy Gel |
| 10 Weeks | | | | | | |
| Appearance | Heavy Sludge | Heavy Sludge | Heavy Sludge | (Heavy Sludge) | Stiff Gel, No Sludge | No Sludge |
| POLYMERIZED PREMIX | | | | | | |
| Physical Properties of Cured Membrane | | | | | | |
| Tensile Strength, psi | 662 | 328 | 521 | — | 757 | 812 |
| Initial Modulus, psi | 600 | 430 | 1,400 | — | 420 | 1,500 |
| Elongation to Break,% | 603 | 407 | 390 | — | 525 | 602 |
| Tear Strength, ppi | | | | | | |
| 2-ipm | 28 | 28 | 37 | — | 31 | 49 |
| 20-ipm | 27 | 37 | 51 | — | 35 | 58 |
| Shore A Hardness | 55 | 54 | 67 | — | 49 | 65 |

FOOTNOTE:
[1]An aliphatic petroleum hydrocarbon resin; Piccotac D of Hercules Incorporated.
[2]A natural aliphatic resin; Blackhawk 500 of Hercules Incorporated.
[3]Polymer of styrene and related monomers, Piccolastic E-75 of Hercules Incorporated.
[4]Ethylene (60%)/vinyl acetate (40%) copolymer; Elvax 40 of I. E. DuPont Co.
[5]Pentaerythritol ester of modified rosin acid; Pentalyn K of Hercules Incorporated.

From a comparison of the data in Table I, it is evident that a rosin ester modified premix has excellent storage stability, especially relative to hydrocarbon resins (Example 6 vs. 2-4) or to unstabilized premix (Example 6 vs. 1). It is also evident that a polyurethane surface prepared by using a rosin ester stabilized premix exhibits, in most respects, superior physical properties relative to an unstabilized premix (Example 6 vs. 1) or to hydrocarbon resin-containing premixes (Example 6 vs. Examples 2-4).

In the following Examples 7-10, premix compositions were prepared as in Example 6 except that each contained a different relative amount of asphalt and the rosin acid ester. These compositions were then stored and their storage stabilities were determined. The formulations were as follows:

| Components, Parts: | |
|---|---|
| Asphalt & Rosin Ester | 47.25 |
| HMDIOL | 38.69 |
| Stiffener | 6.56 |

-continued

| Components, Parts: | |
|---|---|
| Toluene Diluent | 7.44 |
| Polyethyl Acrylate | 0.05 |
| Catalyst | 0.01 |

In Table II below is listed the relative amounts by weight of the asphalt and rosin ester for the premix of each example, the storage stability results and the physical characteristics of the polyurethane surface obtained by polymerizing each using 15 grams of Isonate 143L polyisocyanate per 100 g of premix (provided an NCO-/OH ratio of 1.10).

TABLE II

| Example No. | 7 | 8 | 9 | 10 | 11 |
|---|---|---|---|---|---|
| Asphalt/Rosin Ester Ratio, Wt. | 95/5 | 90/10 | 85/15 | 80/20 | 100/0 |
| Premix Characteristics Brookfield Viscosity Spindle No. 5, 20 rpm, 25° C. cps | 6460 | 6820 | 8320 | 8280 | 7200 |
| Premix Storage Stability | | | | | |
| 1 Day, % Gelled | 100 | 100 | 100 | 100 | 100 |
| 2 Months Sludge, Vol.% | 15 | 5 | 0 | 0 | Heavy Sludge |
| Viscosity Increased | None | None | None | None | — |
| POLYMERIZED PREMIX | | | | | |
| Physical Properties | | | | | |
| Tensile Strength, psi | 602 | 616 | 670 | 658 | 662 |
| Initial Modulus, psi | 530 | 630 | 770 | 930 | 600 |
| Elongation to Break % | 420 | 347 | 440 | 362 | 603 |
| Tear Strength, ppi | | | | | |
| 2-ipm | 30 | 31 | 38 | 45 | 28 |
| 20-ipm | 33 | 35 | 45 | 49 | 27 |
| Shore A Hardness | 57 | 63 | 63 | 65 | 55 |

From a comparison of the data of Table II, it is evident that the addition of rosin acid ester to a polymerizable premix composition improves its storage stability and most of the physical properties of a polyurethane surface prepared using the stabilized premix.

What is claimed is:

1. A method for improving the storage stability of a polymerizable mixture comprising a high molecular weight diol component, a low molecular weight chain stiffener component and an asphalt component which comprises at least substantially increasing said stability by admixing into said mixture an effective amount of at least one rosin acid ester selected from the group consisting of $C_2$-$C_5$ alkane polyol rosin acid esters.

2. A method as in claim 1 wherein said ester is a modified rosin acid ester.

3. A method as in claim 1 wherein said amount of rosin acid ester, based by weight upon said asphalt component, is in the range of from about 5 to 30 percent.

4. A method as in claim 1 wherein said rosin acid ester is pentaerythritol ester.

5. In a polymerizable mixture comprising a high molecular weight diol component, a low molecular weight chain stiffener component and an asphalt component, wherein said asphalt is present in the form of an unstabilized dispersion, solute or sol, the improvement comprising said mixture containing an effective amount of at least one stabilizing agent selected from the group consisting of $C_2$-$C_5$ alkane polyol esters of rosin acids.

6. A mixture as in claim 5 wherein said ester is a modified rosin acid ester.

7. A mixture as in claim 5 wherein said ester is pentaerythritol rosin and ester.

8. A mixture as in claim 5 wherein said ester, based by weight upon said asphalt component, is present in an amount in the range of from about 5 to 30 percent.

9. In a process for producing an asphalt-extended polyurethane surface by admixing an effective amount of a polyisocyanate component with a polymerizable mixture comprising a high molecular weight diol component, a low molecular weight chain stiffener component and an asphalt component, the improvement comprising using as said mixture the composition of claim 5.

* * * * *